(12) United States Patent
Izuhara et al.

(10) Patent No.: US 9,614,215 B2
(45) Date of Patent: Apr. 4, 2017

(54) NEGATIVE ELECTRODE MATERIAL FOR LITHIUM SECONDARY BATTERY AND METHOD FOR MANUFACTURING THE SAME

(71) Applicant: SANGO Co., Ltd, Miyoshi-shi (JP)

(72) Inventors: Kouichi Izuhara, Miyoshi (JP); Makoto Daifuku, Miyoshi (JP); Shunsuke Ouchi, Miyoshi (JP)

(73) Assignee: SANGO CO., LTD., Miyoshi-shi (JP)

( * ) Notice: Subject to any disclaimer, the term of this patent is extended or adjusted under 35 U.S.C. 154(b) by 0 days.

(21) Appl. No.: 14/384,907

(22) PCT Filed: Mar. 7, 2014

(86) PCT No.: PCT/JP2014/056004
§ 371 (c)(1),
(2) Date: Sep. 12, 2014

(87) PCT Pub. No.: WO2014/136946
PCT Pub. Date: Sep. 12, 2014

(65) Prior Publication Data
US 2015/0037675 A1 Feb. 5, 2015

(30) Foreign Application Priority Data

Mar. 8, 2013 (JP) ................................. 2013-047306

(51) Int. Cl.
*H01M 10/04* (2006.01)
*H01M 4/134* (2010.01)
(Continued)

(52) U.S. Cl.
CPC ......... *H01M 4/134* (2013.01); *B23K 26/0066* (2013.01); *H01M 4/38* (2013.01);
(Continued)

(58) Field of Classification Search
CPC ............................ H01M 4/0402; H01M 4/661
See application file for complete search history.

(56) References Cited

U.S. PATENT DOCUMENTS

| | | | |
|---|---|---|---|
| 2004/0229126 A1* | 11/2004 | Matsumoto | H01M 4/04 429/233 |
| 2005/0074671 A1 | 4/2005 | Sugiyama et al. | |
| 2005/0175900 A1* | 8/2005 | Yasuda | H01M 4/043 429/231.95 |

FOREIGN PATENT DOCUMENTS

| | | |
|---|---|---|
| EP | 1542297 A2 | 6/2005 |
| JP | H10-50299 | 2/1998 |

(Continued)

OTHER PUBLICATIONS

T. Sakai; "Development of Alloy-Based Negative Electrodes Prepared by Nano-Designing of Materials for Advanced Lithium Ion Batteries;" Denki-Seiko; vol. 77; No. 4; Dec. 2006; pp. 301-309 (9 Sheets)/p. 5 of specification.

(Continued)

*Primary Examiner* — Stewart Fraser
*Assistant Examiner* — Olatunji Godo
(74) *Attorney, Agent, or Firm* — Kratz, Quintos & Hanson, LLP (57) ABSTRACT

A negative electrode material for a lithium secondary battery, having one of iron foil and iron-base alloy foil, wherein the one of iron foil and iron-base alloy foil which has a surface profile having a plurality of concave shaped hollows formed by heat treating with laser beam irradiation and the surface is a surface which contacts with an electrolyte solution for a lithium secondary battery. There is further provided a lithium secondary battery including a negative electrode of the negative electrode material, a positive electrode using a lithium compound as an active material, an electrolyte between the negative electrode and the positive (Continued)

electrode, and a separator dividing the negative electrode and the positive electrode from each other.

4 Claims, 8 Drawing Sheets

(51) Int. Cl.
- *H01M 4/66* (2006.01)
- *H01M 4/70* (2006.01)
- *B23K 26/00* (2014.01)
- *H01M 4/38* (2006.01)
- *H01M 10/0525* (2010.01)
- *H01M 4/52* (2010.01)
- *H01M 4/80* (2006.01)

(52) U.S. Cl.
CPC .......... *H01M 4/523* (2013.01); *H01M 4/661* (2013.01); *H01M 4/669* (2013.01); *H01M 4/70* (2013.01); *H01M 4/80* (2013.01); *H01M 10/0525* (2013.01); *Y02E 60/122* (2013.01)

(56) References Cited

FOREIGN PATENT DOCUMENTS

| JP | 2003-138384 A1 | 5/2003 |
|---|---|---|
| JP | 2005-158397 A1 | 6/2005 |
| JP | 2006-66696 A1 | 3/2006 |
| JP | 2011-29139 A1 | 2/2011 |
| JP | 2011-129344 A1 | 6/2011 |

OTHER PUBLICATIONS

International Search Report for International Application No. PCT/JP2014/056004 dated Apr. 8, 2014.

EPOA issued to re corresponding European application No. 14761206.3 on Dec. 22, 2015.

S. Grugeon et al., "Combining Electrochemistry and Metallurgy for New Electrode Designs in Li-Ion Batteries", Chemistry of Materials, vol. 17, No. 20, Sep. 9, 2005, pp. 5041-5047.

Dupont et al., "Structure, texture and reactivity versus lithium of chromium-based oxides films as revealed by TEM investigations", Journal of Power Sources, vol. 164, No. 2, , Jan. 20, 2007, pp. 839-848.

Keyu Xie et al., "Iron supported C@Fe3O4 nanotube array: a new type of 3D anode with low-cost for high performance lithium-ion batteries", Journal of Materials Chemistry, vol. 22, No. 12, Feb. 8, 2012, pp. 5560-5567.

Cui C. et al., "Morphological and structural characterizations of different oxides formed on the stainless steel by Nd: YAG pulsed laser irradiation", Applied Surface Science, vol. 254, No. 20, Aug. 15, 2008, pp. 6537-6542.

\* cited by examiner

CHARGE AND DISCHARGE CAPACITY ($\mu$Ah)

| CHARGE CAPACITY ($\mu$Ah) | 555.0 |
|---|---|
| DISCHARGE CAPACITY ($\mu$Ah) | 483.9 |

NEGATIVE ELECTRODE MATERIAL FOR LITHIUM SECONDARY BATTERY AND METHOD FOR MANUFACTURING THE SAME

TECHNICAL FIELD

The present invention relates to a negative electrode material for a lithium secondary battery, a method for manufacturing the negative electrode material, and a lithium secondary battery using the negative electrode material.

BACKGROUND ART

As motor-driving power sources for vehicles such as electric automobiles, high-performance secondary batteries have been recently developed. For secondary batteries to be used for motor driving, high capacities and excellent cycle characteristics are required. Accordingly, active development is being promoted of lithium ion secondary batteries with high theoretical energies.

As the negative electrode materials of existing lithium ion secondary batteries, there are known carbon-based materials, graphite-based materials, oxide-based materials such as CoO, $Co_3O_4$, $Fe_2O_3$, metal nitride-based materials such as $Ge_3N_4$, $Zn_3N_2$, and $Cu_3N$, Li—Si-M-based materials such as $Mg_2Si$, $CrSi_2$, and NiSi, a Li metal, and a Li alloy. In practice, however, carbon-based materials and graphite-based materials are mainly used. In addition, there is known a non-aqueous electrolyte secondary battery using as a negative electrode material a metal carbide such as $Cr_4C$, $VC_2$, $Fe_2C$, or FeC (refer to Patent Literature 1), although such a non-aqueous electrolyte secondary battery is difficult to have a high capacity since the discharge capacity of its test cell is approximately 500 mAh/g, compared to a discharge capacity of 350 mAh/g obtained in a case where a graphite-based material is used for a negative electrode in a comparative example.

As materials that can offer higher capacities and higher energy densities to replace intercalation materials including carbon-based materials and graphite-based materials, Sn and Si alloyed with Li, and materials based on alloys of Sn and Si are receiving attention as negative electrode materials (refer to Non-Patent Literature 1).

Further, unlike the intercalation materials, an iron oxide such as $Fe_2O_3$ performs, as a negative electrode active material, charge and discharge reactions of a conversion type (decomposition and reproduction type). For example, it is reported that as a formula $Fe_2O_3 + 6Li \rightarrow 3Li_2O + 2Fe$ shows, $Fe_2O_3$ decomposes and reduces when it absorbs Li ions at the time of charging so that iron (Fe) and lithium oxide ($Li_2O$) are generated and that iron oxide ($Fe_2O_3$) is reproduced when the Li ions are desorbed at the time of discharging. Patents have been applied for a lithium secondary battery (refer to Patent Literature 2) having a negative electrode that includes an iron oxide film on a rough-surfaced conductive substrate as the conversion-type negative electrode active material, and further for a lithium secondary battery (refer to Patent Literature 3) using as the conversion-type negative electrode active material powders of iron oxide with particle diameters of 1 μm to 20 μm and crystallite sizes of 600 Å or smaller.

A negative electrode active material is usually used by being applied on a negative electrode collector in a mixture with a conduction assistant or a binder. For the collector, aluminum, titanium, copper, iron, stainless steel, etc. are used. Another patent (refer to Patent Literature 4) has been applied for a lithium battery that uses lithium foil or lithium alloy foil as a negative electrode active material. The lithium battery according to Patent Literature 4 is characterized in that the lithium foil or the lithium alloy foil is in a direct contact with a metal collector board of a stainless steel, for example, and that the main surface of the board is a rough surface provided with crater-like spots, by laser processing, having diameters of approximately 20 μm to 100 μm and differences in height of approximately 0.5 μm to 5 μm. The rough surfacing is performed for the purpose of enhancing the adhesive properties between the collector and the lithium foil.

Moreover, laser marking is carried out as processing of inscribing letters, figures, patterns, etc. on various materials. As an example of the laser marking, there is known a surface processing method with which a surface of Ti, a stainless steel, etc. is irradiated with a $YVO_4$ laser having a spot diameter of 20 μm to 80 μm, whereby an ornament excellent in durability and aesthetically pleasing can be created (refer to Patent Literature 5). This method, however, is not used for forming a surface layer part having a functionality of a chemical reaction, for example.

CITATION LIST

Patent Literature

Patent Literature 1: JP 10-050299 A (U.S. Pat. No. 3,048,953)
Patent Literature 2: JP 2011-129344 A
Patent Literature 3: JP 2011-029139 A
Patent Literature 4: JP 2005-158397 A
Patent Literature 5: JP 2003-138384 A

Non Patent Literature

Non Patent Literature 1: "Development of Alloy-Based Negative Electrodes Prepared by Nano-Designing of Materials for Advanced Lithium Ion Batteries", Tetsuo SAKAI, DENKI-SEIKO. 77(4), pp. 301-309, 2006/12.

SUMMARY OF INVENTION

Technical Problem

An existing lithium ion secondary battery mainly uses a carbon-based material or a graphite-based material as a negative electrode active material, and uses as an electrolyte solution a solution obtained by dissolving $LiPF_6$ into a mixture solvent of ethylene carbonate and dialkyl carbonic acid ester. Such a lithium ion secondary battery suffers from disadvantages that a carbon-based material has an intercalation voltage as low as 0.05 V to 0.25 V and that the initial irreversible capacity is increased due to the presence of an SEI (solid electrolyte interphase) film, which is a several-nm-thick coating film, formed on a surface of the negative electrode by an initial charge. Another disadvantage is that when a carbon-based material or a graphite-based material is used as a negative electrode active material, over-charge and over-discharge, for example, cause precipitation of a Li metal and this leads to easy occurrence of ignition. Moreover, although $Fe_2O_3$ as a replacement of a carbon-based material or a graphite-based material has a theoretical capacity of 1008 mAh/g and thus an extremely high capacity, it is reported that the irreversible capacity becomes extremely large and the durability is degraded when a conversion reaction is used.

In the meanwhile, since high capacities are difficult to obtain with the use of a carbon-based material or a graphite-based material, a lithium ion secondary battery is being proposed that uses Sn, Si, or a material based on an Sn alloy or an Si alloy as a negative electrode active material. The proposed type of lithium ion secondary battery is advantageous in that a high capacity can be obtained and a conventional process of preparing an electrode using a conduction assistant or a binder is not necessary. On the other hand, it is disadvantageous in that since the volumes of the above metals change to a large extent due to absorption and discharge of Li, the metals become finer and the cycle characteristics are degraded due to repeated charges and discharges, and therefore the battery has difficulty in having a long life. Under these circumstances, improving a durability while maintaining a high capacity with the use of an alloy-based material for a negative electrode active material has been a goal. Enhancement of the energy density of a lithium secondary battery requires increases in the capacities of a positive electrode and a negative electrode and in an operating voltage, and development is being promoted of a new electrolyte solution having resistances to flame and oxygen and using a solvent other than ethylene carbonate.

An object of the present invention is to provide a high-capacity lithium secondary battery at a low price that attains an increased reversibility of charge and discharge by using a new negative electrode material different from the existing negative electrode materials. Another object is to provide a lithium secondary battery that can use an existing electrolyte solution at a small risk of ignition or overheating.

Solution to Problem

The inventors of the claimed invention have found out that they can provide a lithium secondary battery having a high capacity and excellent charge and discharge characteristics without using an existing negative electrode including an active material layer coated on a surface of a collector, if they form a surface profile having a plurality of minute, concave shaped hollows such as holes or recesses in a surface layer part of an iron foil or an iron-base alloy foil conventionally used as a collector by irradiating the surface of the iron foil or the iron-base alloy foil with a laser beam, and bring the surface into a direct contact with an electrolyte solution for a lithium secondary battery.

In other words, the present invention provides a negative electrode material for a lithium secondary battery (1) comprising one of an iron foil and an iron-base alloy foil, wherein the one of the iron foil and the iron-base alloy foil has a surface profile having a plurality of concave shaped hollows formed by heat treating with laser beam irradiation and the surface is a surface which contacts with an electrolyte solution for a lithium secondary battery.

Further, the present invention provides a negative electrode material for a lithium secondary battery (2) according to (1), in which the hollow is one of a hole and a recess.

Furthermore, the present invention provides a negative electrode material for a lithium secondary battery (3) according to (1) or (2), in which the one of the iron foil and the iron-base alloy foil serves as a negative electrode collector.

Furthermore, the present invention provides a negative electrode material for a lithium secondary battery (4) according to any one of (1) to (3), in which the one of the iron foil and the iron-base alloy foil has a thickness of 5 μm to 20 μm and a depth from a plane surface of the concave shaped hollow at an edge of the hollow to the lowermost part of the hollow is 0.5 μm to 2.5 μm.

Moreover, the present invention provides a negative electrode material for a lithium secondary battery (5) according to any one of (1) to (4), in which the one of the iron foil and the iron-base alloy foil which is included is provided with a concave shaped hollow formed by heat treating a surface of the iron foil or the iron-base alloy foil by irradiating and scanning the surface with a laser beam.

Moreover, the present invention provides a lithium secondary battery (6) including: a negative electrode formed of the negative electrode material according to any one of (1) to (4); a positive electrode using a lithium compound as an active material; an electrolyte solution between the negative electrode and the positive electrode; and a separator dividing the negative electrode and the positive electrode from each other.

Figure 1:
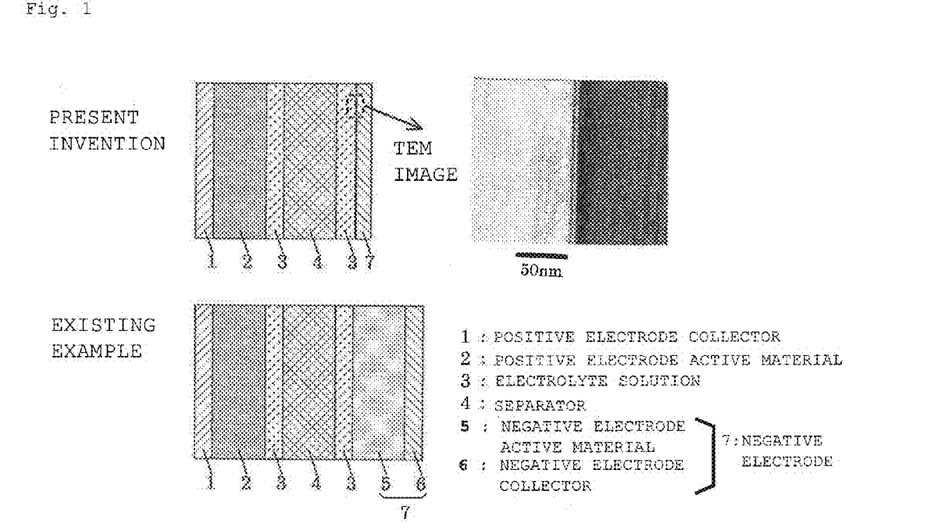
FIG. 1 is a cross-sectional schematic drawing that illustrates a comparison between two lithium secondary batteries using negative electrode materials according to an existing example and the present invention, respectively.

FIG. 1 schematically illustrates a cross-sectional configuration of a lithium secondary battery using a negative electrode material according to the present invention, and the configuration of a typical type of existing lithium secondary battery for comparison. A lithium battery usually includes a positive electrode having a positive electrode collector 1 and a positive electrode active material 2, an electrolyte solution 3, a separator 4, and a negative electrode having a negative electrode active material 5 and a negative electrode collector 6. Formation of the negative electrode material according to the present invention does not require application of the negative electrode active material layer 5 on a surface of the negative electrode material. In the lithium secondary battery of the present invention, one of an iron foil and an iron-base alloy foil alone with a thickness nearly equal to that of a collector of an existing lithium battery completes a negative electrode 7. Using the negative electrode 7 promotes a reaction, caused by charging, between an electrolyte solution and a surface layer part of the iron foil or the iron-base alloy foil of the negative electrode 7, so that a compound layer is generated at an interface between the negative electrode and the electrolyte solution, as the TEM observed image of FIG. 1 shows.

It is known that when a lithium ion secondary battery using a carbon material as a negative electrode active material is subjected to an initial charge in a non-aqueous electrolyte, the solvent in the electrolyte is reduced and a coating film called an SEI film is formed on a surface of the negative electrode active material. The SEI film is a passivation film of a lithium compound such as $Li_2O$, $Li_2CO_3$, and LiF. The lithium ions consumed for forming the lithium compound cannot contribute to a charge capacity, so that an irreversible capacity at the initial charge, that is, a difference between a charge capacity and a discharge capacity is increased. The irreversible capacity becomes larger as the SEI film is formed in a larger amount. Therefore, the amount of the SEI film to be formed on a surface of the negative electrode is preferably made as small as possible.

The inventors have not yet clearly figured out the reason for increases in the reversibility of charge and discharge and in the capacity occurred when they use as the negative electrode material an iron foil or an iron-base alloy foil having a surface profile formed by laser beam irradiation. They infer, however, from the results of the TEM observation of the interface between the negative electrode and the electrolyte solution after charging, that the reason is that a surface of the negative electrode which is in a direct contact with the electrolyte solution chemically reacts with the electrolyte solution at the charging and a thick Li compound layer is resultantly formed, unlike a known intercalation phenomenon of Li or a known alloying reaction with Li ions made by Si-based and Sn-based active materials, for example. The inventors speculate that the above chemical reaction is caused in a manner such that crystal grains modified by heat treating or nano-particles of $Fe_3O_4$ generated by heat treating serve to allow the surface layer part to have a strong reduction power and a low potential and further to perform catalysis. Given the result of the TEM observation and an excellent function exercised on the charge and discharge characteristics, the inventors have considered that an essential difference exists between the existing SEI film and the Li compound layer formed at the interface between the electrolyte solution and a surface of the negative electrode according to the present invention not using a carbon material as the negative electrode active material.

Advantageous Effects of Invention

According to the present invention, it is possible to provide a lithium secondary battery with excellent charge and discharge characteristics by using as a negative electrode material an iron foil or an iron-base alloy foil having a surface profile with a plurality of concave shaped hollows formed by laser beam scanning. Further, it is possible to provide a lithium ion secondary battery having a function of an iron foil or an iron-base alloy additionally serving as a collector and resistances to corrosion and heat. Furthermore, a simple manufacturing process and a low cost are attained, since a collector alone can complete the negative electrode and therefore steps of mixing, coating, drying, etc. of a negative electrode active material are not necessary for forming an active material layer on a surface of the collector. Moreover, since over-charge and over-discharge, for example, do not easily lead to precipitation of Li metal at least in principle, notably advantageous effects such as great safety and high capacity of a secondary battery can be obtained.

DESCRIPTION OF EMBODIMENTS

The negative electrode material according to the present invention will be hereinafter described in detail. The negative electrode material according to the present invention is formed by scanning a surface of an iron foil or an iron-base alloy foil by a laser beam and thereby modifying the crystals of a surface layer part by heat treating. The iron foil or the iron-base alloy foil can additionally serve as a negative electrode collector.

As an iron foil to be used as the negative electrode material according to the present invention, a pure iron foil such as an electromagnetic soft iron defined by JIS C2504 or a carbon steel foil defined by JIS G3141, for example, may be used. The standard electromagnetic soft irons have four types of SUY-0 to SUY-3. The electromagnetic soft irons each chemically contain C, Mn, and Si in concentrations of 0.03% by mass or smaller, 0.50% by mass or smaller, 0.20% by mass or smaller, respectively, and Fe and inevitable impurities for the rest. A carbon steel SPCC, which is the most common cold-rolled steel, chemically contains C, Mn, P, and S in concentrations of 0.15% by mass or smaller, 0.60% by mass or smaller, 0.100% by mass or smaller, and 0.035% by mass or smaller, respectively, and Fe and inevitable impurities for the rest. An alloy containing not less than 50% by weight of iron is generally called an iron alloy or an iron-base alloy. A stainless steel is categorized as an iron-base alloy. The term "iron-base alloy" in the specification is used to indicate the alloys as described above. Examples of the iron-base alloy foil include iron-based alloys such as an iron nickel alloy, an iron chromium alloy, an iron molybdenum alloy, a stainless steel, and a low-alloy steel.

As the stainless steel, any type of stainless steel foil is usable. Specifically, there may be used austenitic stainless steel foils (SUS304, SUS304-L, SUS302, SUS301, SUS310S, SUS321, SUS316, SUS316-L, for example), ferritic stainless steel foils (SUS430, SUS434, for example), martensitic stainless steel foils (SUS410S, SUS420J2, for example), precipitation hardening stainless steel foils (SUS631, ASL-350, for example), etc., as defined in JIS G4305: 2005, "cold-rolled stainless steel and steel band".

Although the thickness of the iron foil or the iron-base alloy foil to be used is not particularly limited as long as the thickness is not larger than approximately 1 mm, it is desirable that the thickness is approximately 5 μm to 100 μm, which corresponds to the thickness of an existing collector, and is more desirable that the thickness is approximately 5 μm to 20 μm for practical use.

Examples of types of lasers include various gaseous lasers such as a $CO_2$ laser, an Ar laser, and an excimer laser, and various solid lasers such as a YAG laser, a YLF laser, and a $YVO_4$ laser. In particular, a $YVO_4$ laser, where a single mode oscillation is possible, is advantageous for adjusting the diameter of a beam to a smallest possible value or for forming fine dots or recesses so as to be periodically arranged with a high precision.

In the meanwhile, a laser marker is known as a means for forming letters, patterns, etc. on a surface layer part of a metal material such as a stainless steel. A laser marker itself is a processing means with which an area of a surface layer part of a material is vaporized, scratched, or changed thermally or chemically by a laser beam. Such a commercially available laser marker machine may be employed for modifying the surface layer part by heat treating in the present invention.

A desirable type of laser in the present invention is a $YVO_4$/SHG laser with a wavelength of 532 nm suitable for weak heat treating, since the present invention does not require laser beam irradiation necessary for forming a hollow such deep as to melt and penetrate an iron foil or an iron-base alloy foil. By narrowing down an SHG laser with a high absorption as much as possible, a power density can be increased to a large extent and highly efficient heat treating is enabled.

Although it is preferable that regularly-arranged concave shaped hollows, such as hole patterns or recess patterns, are formed by adjusting the conditions for laser beam irradiation so as to heat-treat a surface layer part of an iron foil or an iron-base alloy foil and by performing scanning by a laser beam, the pattern of each concave shaped hollow on a two-dimensional level is not particularly limited. The concave shaped hollow may be not only a shallow crater-like hole but also a recess in the shape of a shallow tub, for example. Although the environments for the laser beam irradiation are not particularly limited, performing the irradiation in the atmosphere is desirable in terms of productivity.

Unlike the other iron foils and iron-base alloy foils, a stainless steel includes a passive coating film on a surface thereof. The passivation film usually has a thickness of approximately 1 nm to 3 nm, and includes a chromium oxide film and a film of Fe hydroxide and Cr hydroxide. The passivation film, however, will be removed through laser beam irradiation by a laser maker machine, other than the part of the passivation film at the edges of a concave shaped hollow, in a manner such that the laser beam irradiation instantaneously heats a surface layer part of the stainless steel and melts the surface layer part other than the hollows.

Figure 2:
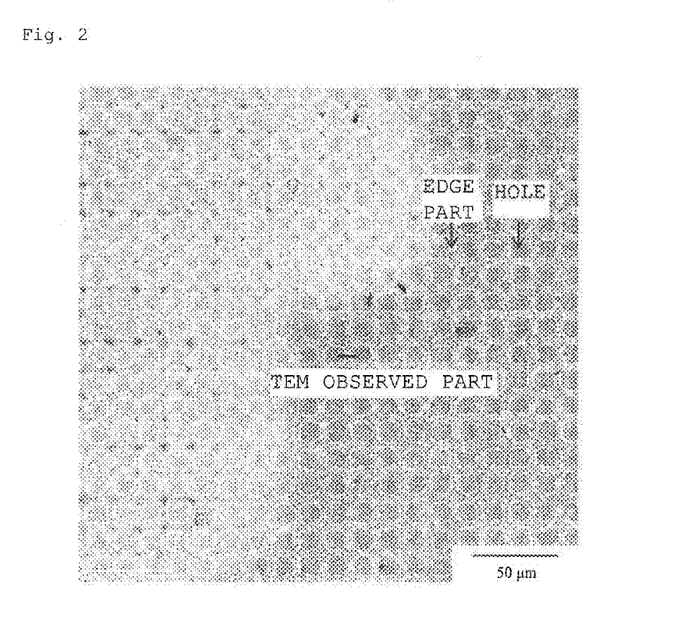
FIG. 2 is a drawing-substituting photograph that shows an SIM image in a case where holes are regularly arranged like dots in a surface of a stainless steel foil by irradiating the surface with a laser beam.
Figure 3:
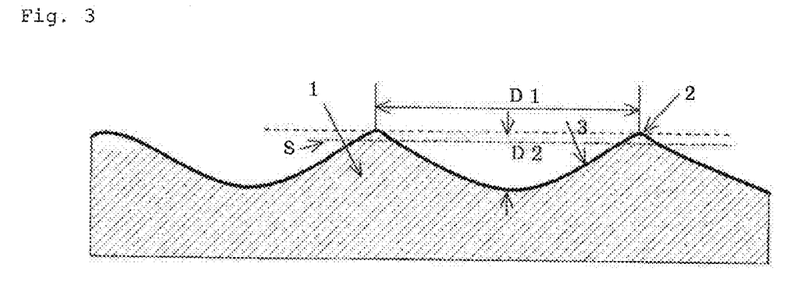
FIG. 3 is a schematic drawing that illustrates a cross-sectional configuration of a crater-like hole with a small depth, which is seen in an exemplary surface profile of the negative electrode material according to the present invention.

FIG. 2 illustrates an SIM image in a case where holes are regularly arranged like dots in a surface of a stainless steel foil by irradiating the surface with a laser beam. FIG. 3 is a schematic diagram that illustrates a cross section of a single hole. Descriptions will be made of a case where shallow crater-like holes, each of which is shown in FIG. 3, are arranged in a surface of the stainless steel foil as concave shaped hollows. In that case, heat treating using a laser instantaneously melts a surface layer part of a stainless steel 1, whereby the surface layer part is transformed, which causes formation of a shallow crater-like hole having an edge part 2 and a curved part 3. In the formation, the surface layer part of the stainless steel 1 is subjected to heat treating, and as a result, the passivation film mainly including a chromium oxide on a surface of the hole is removed, so that a crystalline surface of the stainless steel base material is exposed. Further, the inventors consider that in the formation of the hole, a cooling rate for the region from the edge part 2 to the bottom of the hole is slowed down and nano-particles of $Fe_3O_4$ are generated on a surface of the curved part 3 from the edge part 2 to the bottom of the hole. Further, the surface area of the negative electrode material is larger in the presence of the concave shaped hollow than in the absence thereof, and the increase in the surface area contributes to increase in battery capacity.

As shown in FIG. 3, the depth D2 from the plane surface of the edge part 2 formed to be slightly higher than a surface S of the stainless steel foil to the lowermost part of the hollow is not particularly limited as long as the depth at a maximum does not penetrate the stainless steel foil. The depth, however, is preferably in a range of approximately 0.5 μm to 2.5 μm when the thickness of the stainless steel foil is in a range of 5 μm to 20 μm for practical use. The depth can be measured with a laser microscope. Since the period of time for heat treating so as to obtain the depth D2 of approximately 2.5 μm is sufficient for obtaining advantages of modifying the surface layer part, laser beam irradiation becomes unnecessary when the depth D2 exceeds 2.5 μm. When a laser beam is applied to a dot pattern, the space between dots next to each other is made as small as possible. In view of the printing resolution of a laser marker machine, the diameter D1 of dots illustrated in FIG. 3 is preferably set to approximately 5 μm to 20 μm. When recesses are formed, a space between recesses next to each other may be the same as that between dots.

The negative electrode material according to the present invention is used to form a lithium secondary battery. In other words, a lithium secondary battery can be formed of: a negative electrode of the negative electrode material according to the present invention; a positive electrode using a lithium compound as an active material; an electrolyte solution between the negative electrode and the positive electrode; and a separator dividing the negative electrode and the positive electrode from each other. No particular limitations are imposed on the configurations and the sizes of an organic solvent and an electrolyte of the electrolyte solution, the positive electrode, the separator, and an external container forming the secondary battery, and existing known types thereof can be used. In the present invention, a collector is unnecessary due to the provision of the negative electrode material according to the present invention additionally serving as a collector. In order to increase the conductivity, an iron foil or an iron-base alloy foil may be coated with a lamination of conductive foils such as copper and aluminum, or a film of copper or aluminum, for example, on a surface of the iron foil or the iron-base alloy foil which is opposed to a surface thereof in contact with the electrolyte solution.

The positive electrode collector may be formed of aluminum, nickel, or stainless steel, for example. As the positive electrode active material, a lithium oxide, a composite oxide containing lithium and transition metal, a lithium sulfide, an interlayer compound containing lithium, a lithium phosphate compound, etc. may be used.

As the separator, a polyolefin porous film of polypropylen (PP) or polyethylene (PE), for example, or a ceramic porous film may be used.

As the non-aqueous organic solvent, ethylene carbonate, propylene carbonate, dimethyl carbonate, diethyl carbonate, or ethyl methyl carbonate is preferable. Fluoro-ether may be used for increasing the resistance to flame of the electrolyte solution. The non-aqueous organic solvent may include an organic silicon compound as an additive.

Examples of a usable electrolyte salt include lithium hexafluorophosphate ($LiPF_6$), lithium tetrafluoroborate ($LiBF_4$), lithium perchlorate ($LiClO_4$), lithium hexafluoroarsenate ($LiAsF_6$), bis(pentafluoroethane sulfonyl) imide lithium ($LiN(C_2F_5SO_2)_2$), lithium trifluoromethane sulfonate ($LiCF_3SO_3$), bis(trifluoromethane sulfonyl) imide lithium ($LiN(CF_3SO_2)_2$), lithium tris (trifluoromethane sulfonyl) methide ($LiC(CF_3SO_2)_3$), lithium chloride (LiCl), and lithium bromide (LiBr). Further, an ionic liquid or a gel electrolyte may be used.

TEM observation is carried out of product materials at the interface between the electrolyte solution and the negative electrode, which are generated when an initial charge is performed on a lithium secondary battery using the negative electrode material according to the present invention. As a result of the observation, it is found that a thick compound layer is formed to have a thickness of approximately tens of nm to 100 nm. From a depth-directional XPS analysis of charged and discharged states, the inventors infer that a layer including $Li_2O_3$ as the main component and a mixture of a Li hydroxide, carbon oxide, fluoride, and phosphorus oxide as the rest of the components is formed on a surface of the negative electrode in a full charge state to have a thickness of approximately tens of nm to 100 nm and that Li is absorbed in the layer. The Li compound layer is made thinner due to discharge, and mostly disappears in a full discharge state. The inventors consequently consider that a reversible reaction proceeds unlike in the case of using an SEI film formed on a surface of a negative electrode of an existing carbon-based or graphite-based material.

The present invention will be hereinafter described in detail based on experiments and embodiments. It is to be noted that the present invention is not limited to the embodiments.

Experiment 1

Figure 4:
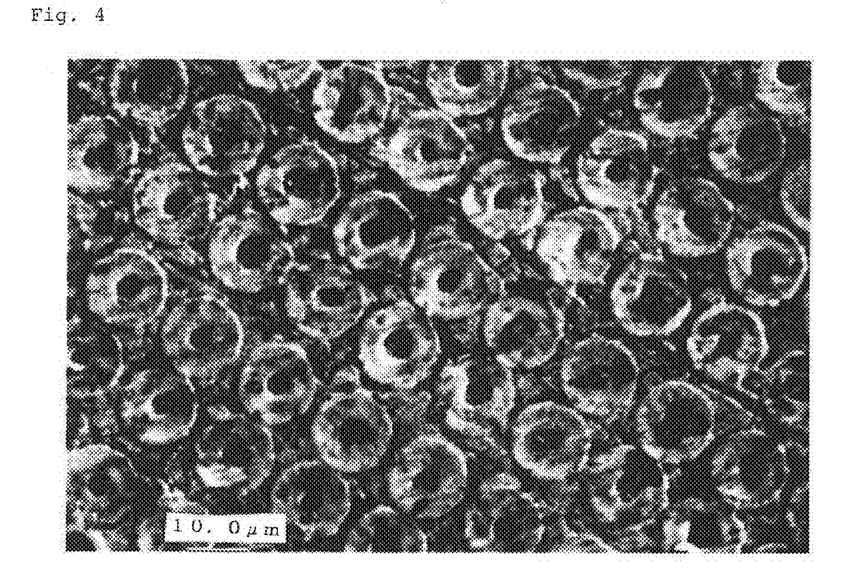
FIG. 4 is a drawing-substituting photograph that shows an SIM image of a surface profile of a stainless steel foil on which heat treating has been performed by a laser in Experiment 1.

A test cell using the negative electrode material according to the present invention is manufactured and a charge state of the test cell is checked. A square with a side of 40 mm is formed by punching a 1 mm-thick stainless steel foil SUS316 (manufactured by Nippon Steel & Sumikin Stainless Steel Corporation, NSSC, TP-316) so that a negative electrode material is prepared. A passive coating film on a surface of the stainless steel foil is left as it is. As a laser device, a laser marker MD-T1010 (manufactured by Keyence Corporation) is used. A surface of the stainless steel foil is irradiated with a laser beam for heat treating while the surface is scanned by a $YVO_4$ laser with respect to the vertical and horizontal directions in turn from a perpendicular side under the conditions that the output is 4 w×25%, the scanning speed is 1600 mm/s, and the frequency is 80 KHz. The $YVO_4$ laser has a wavelength of 532 nm, an average output of 4 W, and a maximum printing speed of 12000 mm/s. By the above irradiation, shallow crater-like holes are regularly opened into the vertical and horizontal directions. It takes 72 seconds to carry out dot processing on the entire surface. The crater-like holes have a diameter D1 of approximately 15 µm and a depth D2 of approximately 1.0 µm. The depth D2 is measured with a laser microscope VK series. FIG. 4 illustrates an SIM observed image of the surface profile of the stainless steel which has been heat-treated by the laser beam irradiation.

Next, a disc with a diameter of 16 mm is formed by punching the stainless steel foil which has been heat-treated by the laser beam irradiation as described above, so that the disc can be used as a negative electrode additionally serving as a negative electrode collector. A surface of the thus obtained negative electrode is brought into contact with an electrolyte solution, and a counter electrode is made of lithium metal. Further, a coin battery for a test cell is manufactured using the negative electrode, the counter electrode, and the electrolyte solution, and the charge characteristics of the coin battery are measured. For the facility for evaluating the characteristics, CELLTEST-8 system (1470E) manufactured by Solatron is used.

As the separator, a three-layered micro-porous battery separator of polypropylene, polyethylene, and polypropylene (the registered trademark is Celgard) is used. As the electrolyte solution, a solution containing ethylene carbonate and dimethyl carbonate in a ratio of 1:2 (v/v %) is used. Further, lithium hexafluorophosphate with a concentration of 1 mol/L is used as the electrolyte. The conditions for charge are that a thermostatic chamber is set at a temperature of 60° C. and the charge is constant-current charge performed at 10 µA and ends at 0 V.

Figure 5:
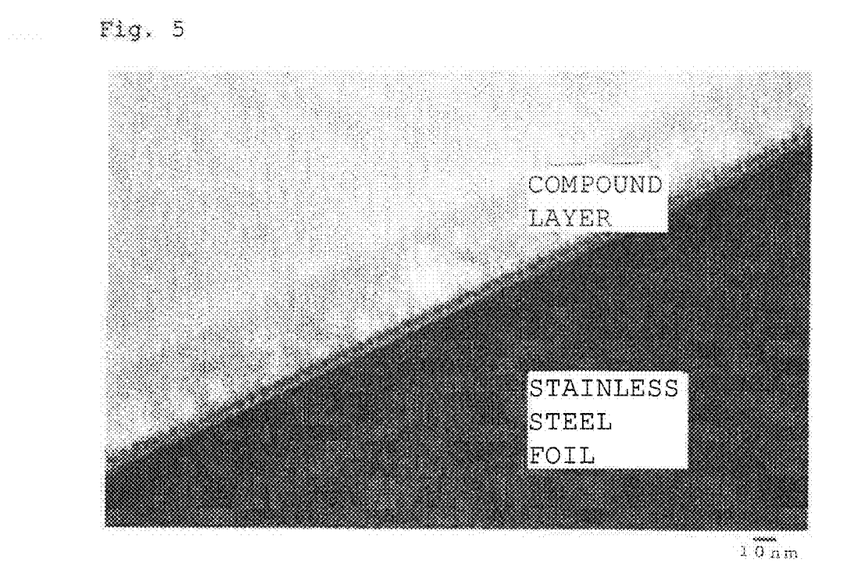
FIG. 5 is a drawing-substituting photograph that shows a cross section of a TEM observed image (at eight hundred thousand-fold magnification) of an interface between a negative electrode and an electrolyte solution after an initial charge of a test cell of Experiment 1.
Figure 6:
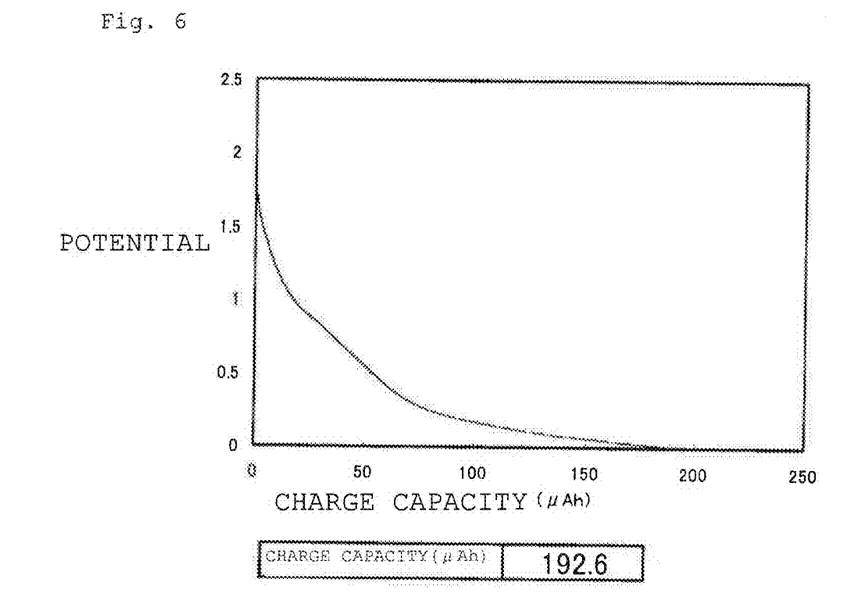
FIG. 6 is a graph that shows initial charge characteristics of the test cell of Experiment 1.

TEM observation is carried out of a surface of the negative electrode material at an initial charge. As a result of the observation, it is found that a thick compound layer (gray area) with a thickness of approximately 50 nm is formed at the interface between the negative electrode (black area) and the electrolyte solution, as FIG. 5 illustrates. FIG. 6 shows initial charge characteristics of the test cell. The charge capacity is 192.6 µAh.

Experiment 2

A test cell using the negative electrode material according to the present invention is manufactured and a discharge state of the test cell is checked. A stainless steel foil is irradiated with a laser beam so as to be heat-treated with a laser output set to 4w×30%. The crater-like holes have a diameter D1 of approximately 20 µm and a depth D2 of approximately 1.5 µm. The depth D2 is measured with a laser microscope VK series. The test cell is manufactured and evaluated under the same conditions as those employed for Experiment 1, except that the stainless steel foil obtained is used as the negative electrode.

Figure 7:
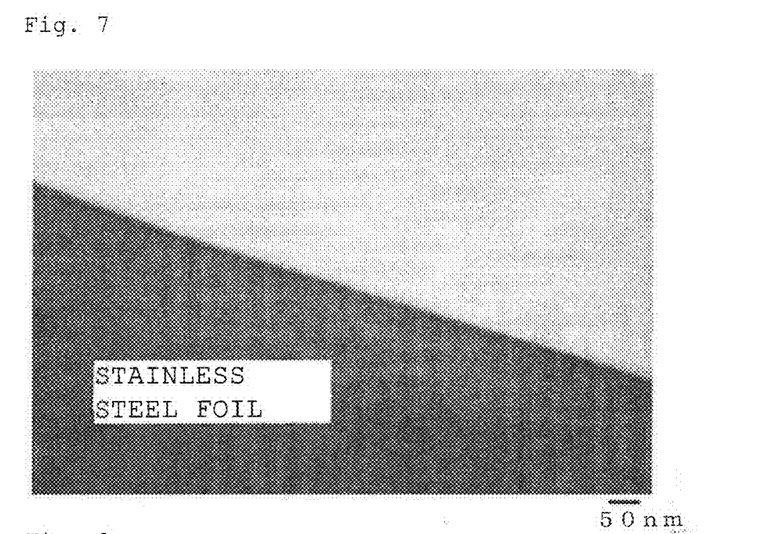
FIG. 7 is a drawing-substituting photograph that shows a cross section of a TEM observed image (at two hundred thousand and forty thousand-fold magnification) of an interface between a negative electrode and an electrolyte solution after an initial discharge of a test cell of Experiment 2.
Figure 8:
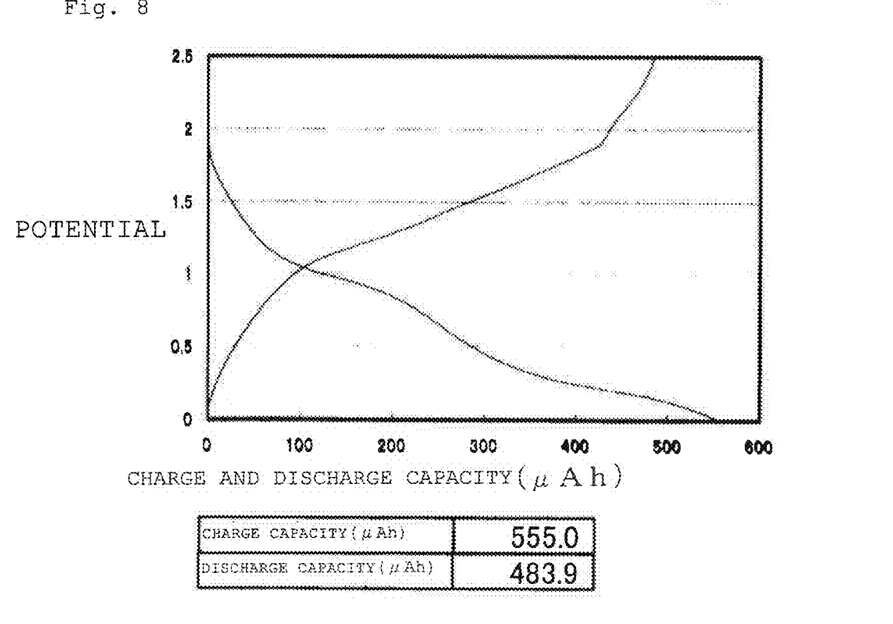
FIG. 8 is a graph that shows initial charge and discharge characteristics of the test cell of Experiment 2.

The conditions for charge and discharge are that a thermostatic chamber is set at a temperature of 60° C., the charge is constant-current charge performed at 10 µA, ends at 0 V, and stops for 10 minutes, and the discharge is constant-current discharge performed at 10 µA and ends at 2.5 V. TEM observation is carried out of the surface of the negative electrode at an initial discharge. As a result of the observation, it is found that the thick compound layer generated in Experiment 1 at the interface between the negative electrode (black area) and the electrolyte solution has disappeared, as FIG. 7 illustrates. FIG. 8 shows initial charge and discharge characteristics of the test cell. The charge capacity is as high as 555.0 µAh and the discharge capacity is as high as 483.9 µAh Embodiment 1

A full cell is manufactured using the negative electrode obtained in Experiment 2. A separator is inserted into a battery container made of stainless steel. On both sides of the separator, a positive electrode and a negative electrode are placed. As the positive electrode, an electrode having one surface coated with lithium cobalt oxide so as to have a capacity of 1.6 mAh/cm$^2$ is used. Further, the negative electrode is made of the stainless steel foil manufactured in Experiment 2 which is brought in a direct contact with an electrolyte solution. The positive electrode is brought into contact with an aluminum collector, and the aluminum collector is brought into contact with the battery container. The negative electrode material is allowed to additionally serve as a negative electrode collector and is brought into contact with the battery container. The separator, the electrolyte solution, and the electrolyte are the same as those employed in Experiments 1 and 2.

Figure 9:
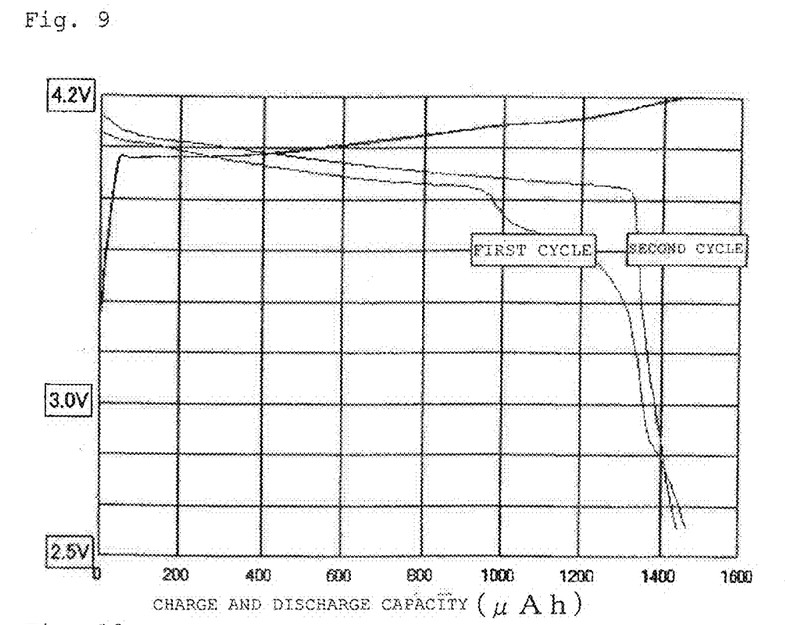
FIG. 9 is a graph that shows charge and discharge characteristics of a full cell of Embodiment 1.

The conditions for charge and discharge are that a thermostatic chamber is set at a temperature of 25° C., the charge is constant-current charge performed at 30 μA, and charging and discharging voltages range from 4.3 V to 2.5 V. FIG. 9 illustrates the charge and discharge characteristics of the full cell. The charge capacity and discharge capacity in a first cycle are 1467 μAh and 1466 μAh, respectively, and the charge capacity and discharge capacity in a second cycle are 1458 μAh and 1441 μAh, respectively. The irreversible capacity can be reduced to a large extent and an initial charge and discharge efficiency is nearly 100%.

Experiment 3

Figure 10:
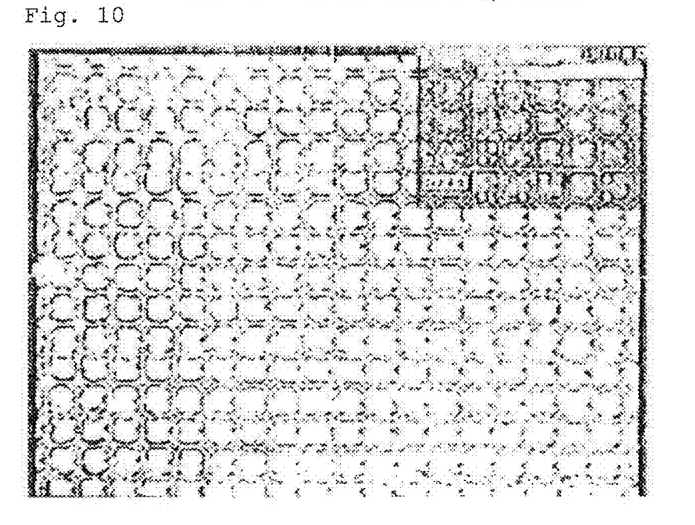
FIG. 10 is a drawing-substituting photograph that shows an SIM image of a surface of an electromagnetic soft iron foil on which heat treating has been performed by a laser in Experiment 2.

A square with a side of 50 mm is formed by punching a 10 μm-thick electromagnetic soft iron foil (SUYP JIS C 2504) instead of the stainless steel foil in Experiment 1 so that a negative electrode material is prepared. Shallow crater-like holes are regularly opened into the vertical and horizontal directions in the same manner as in Experiment 1 using a laser device under the conditions that the output is 4 w×25%, the scanning speed is 1200 mm/s, and the frequency is 80 KHz. As the laser device, the same laser device as that employed in Experiment 1 is used. It takes 181 seconds to carry out dot processing on the entire surface. The crater-like holes have a diameter D1 of approximately 15 μm and a depth D2 of approximately 1.2 μm. FIG. 10 illustrates an SIM observed image of the surface of the electromagnetic soft iron foil which has been heat-treated by the laser beam irradiation.

Figure 11:
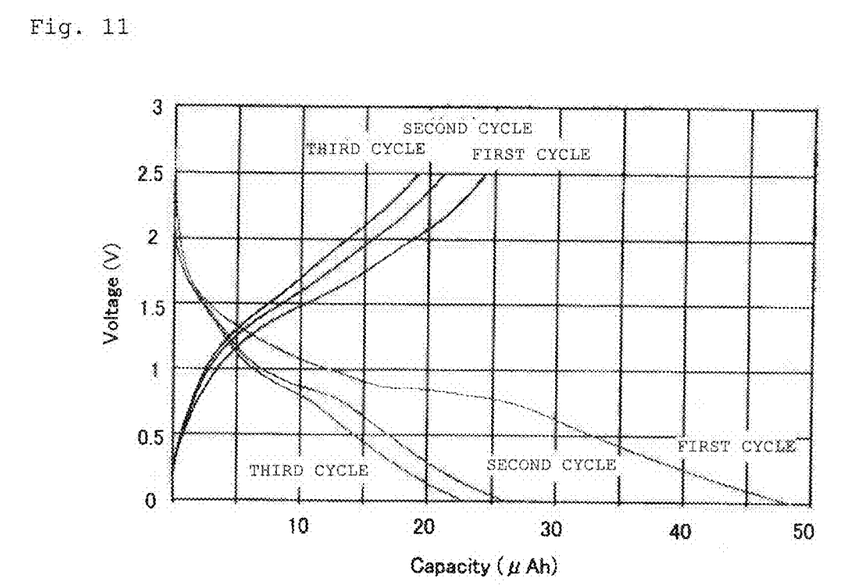
FIG. 11 is a graph that shows charge and discharge characteristics of a test cell of Experiment 3.

A disc with a diameter of 16 mm is formed by punching the electromagnetic soft iron foil thus obtained, a test cell is manufactured as a negative electrode additionally serving as a negative electrode collector, and the charge and discharge capacities of the test cell are measured under the same conditions as those employed for Experiments 1 and 2. FIG. 11 illustrates the results of charge and discharge of the test cell. The charge capacities in the first, second, and third cycles are 49 μAh, 26 μAh, and 23 μAh, respectively, and the discharge capacities in the first, second, and third cycles are 24 μAh, 21 μAh, and 19 μAh, respectively.

Embodiment 2

Figure 12:
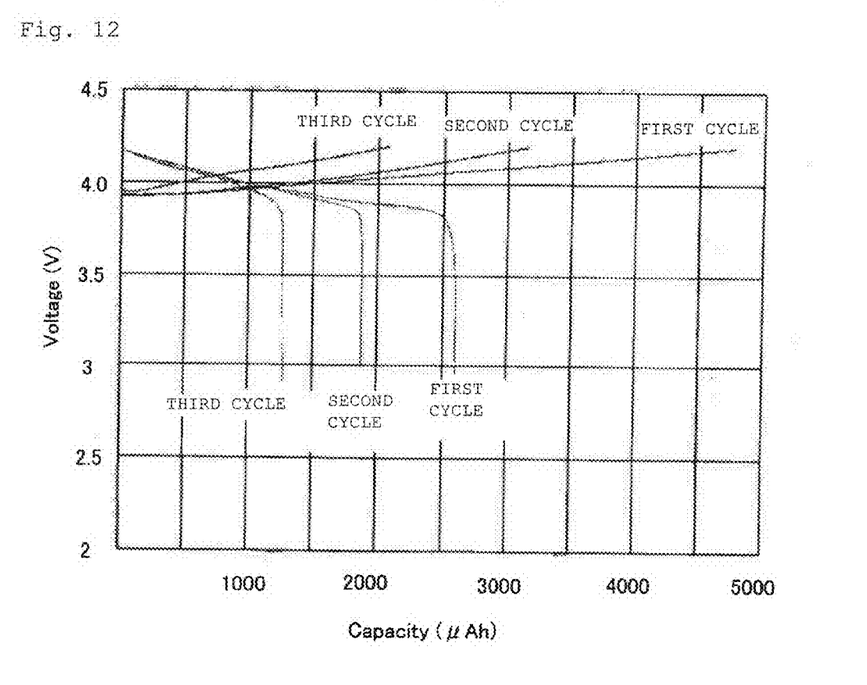
FIG. 12 is a graph that shows charge and discharge characteristics of a full cell of Embodiment 2.

A full cell is manufactured using the negative electrode manufactured in Experiment 3 under the same conditions as those employed for Embodiment 1, except that the capacity of lithium cobalt oxide is set at 3 mAh/cm$^2$, and the charge and discharge characteristics are evaluated. FIG. 12 illustrates the charge and discharge characteristics of the full cell. The charge capacities in the first, second, and third cycles are 4783 μAh, 3169 μAh, and 2080 μAh, respectively, and the discharge capacities in the first, second, and third cycles are 2608 μAh, 1882 μAh, and 1268 μAh, respectively.

Experiment 4

Figure 13:
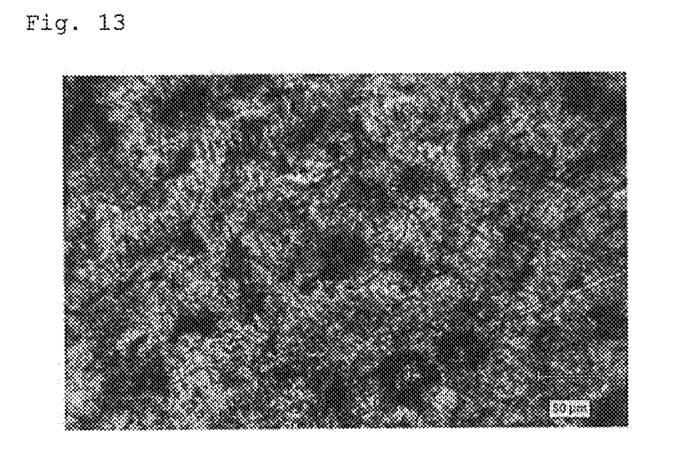
FIG. 13 is a drawing-substituting photograph that shows an optical microscope mage of a surface of a carbon steel foil on which heat treating has been performed by a laser in Experiment 3.

A square with a side of 50 mm is formed by punching a 1 mm-thick cold-rolled steel foil (SPCC JIS G 3141) instead of the stainless steel foil in Experiment 1 so that a negative electrode material is prepared. As a laser device, a laser marker SUNXLP-Z250 (manufactured by Panasonic Electric Works Co., Ltd.) is used. Shallow crater-like holes are regularly opened into the vertical and horizontal directions in the same manner as in Experiment 1, using a YAG laser, under the conditions that the laser power is 1 w, the scanning speed is 120 mm/s, and the printing pulse is 10 μs. The YAG laser has a wavelength of 532 nm, an average output of 1 W, and a maximum printing speed of 12000 mm/s. The crater-like holes have a diameter D1 of approximately 15 μm and a depth D2 of approximately 2 μm. FIG. 13 illustrates an optical microscope mage of the surface of the cold-rolled steel foil which has been heat-treated by the laser beam irradiation.

Figure 14:
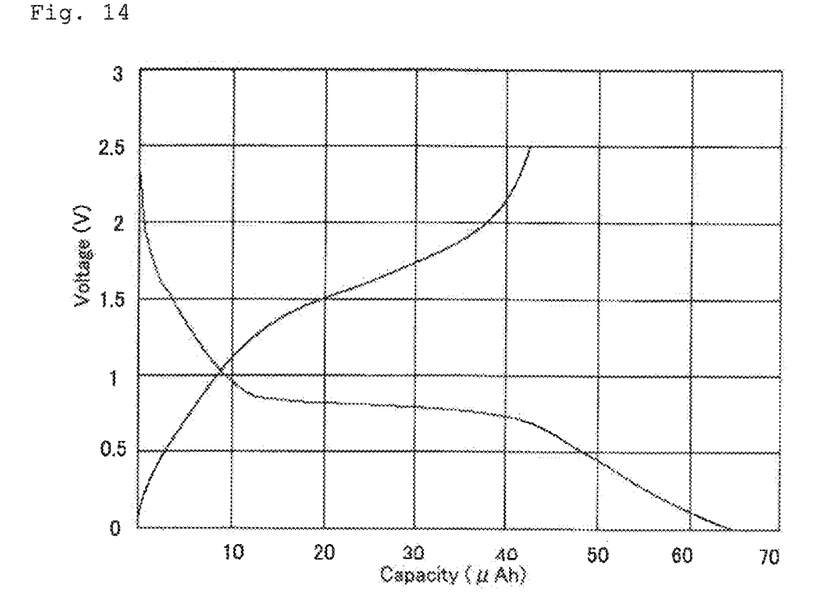
FIG. 14 is a graph that shows charge and discharge characteristics of the test cell of Experiment 3.

A disc with a diameter of 16 mm is formed by punching the cold-rolled steel foil thus obtained, a test cell is manufactured as a negative electrode additionally serving as a negative electrode collector, and the charge and discharge capacities of the test cell are measured under the same conditions as those employed for Experiments 1 to 3. FIG. 14 illustrates the results of charge and discharge of the test cell. The charge capacity and the discharge capacity in the first cycle are 65 μAh and 43 μAh, respectively.

Embodiment 3

Figure 15:
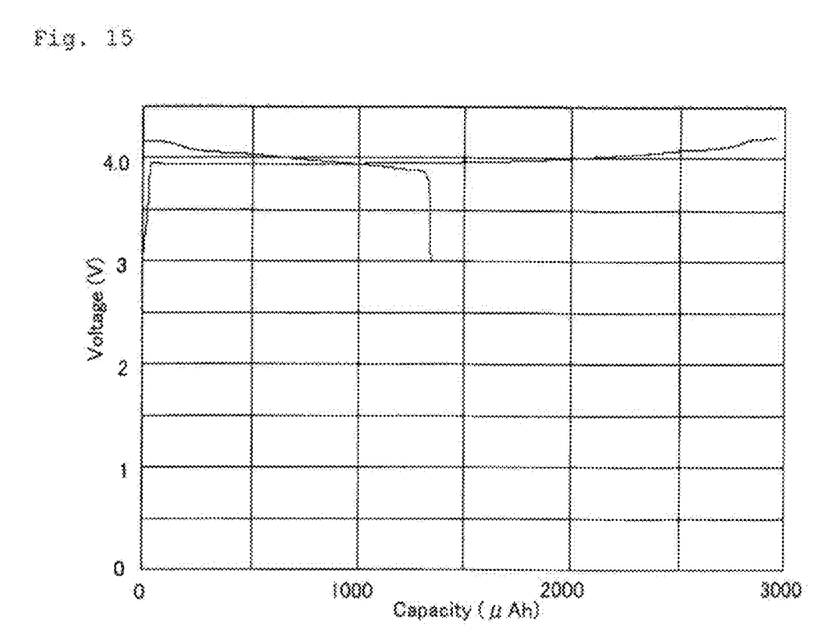
FIG. 15 is a graph that shows charge and discharge characteristics of a full cell of Embodiment 3.

A full cell is manufactured using the negative electrode manufactured in Experiment 4 under the same conditions as those for Embodiment 1 except that the capacity of lithium cobalt oxide is set at 3 mAh/cm$^2$, and the charge and discharge characteristics are evaluated. FIG. 15 illustrates the charge and discharge characteristics of the full cell. The charge capacity and the discharge capacity in the first cycle are 2960 μAh and 1344 μAh, respectively.

INDUSTRIAL APPLICABILITY

The negative electrode material according to the present invention can be easily manufactured using publicly-available iron foil or iron-base alloy foil and a laser marking technique. Further, the negative electrode material can be manufactured at a low cost since a convent ional step is unnecessary of applying an expensive active material on a surface of a negative electrode. The negative electrode material is being expected to be used as a new revolutionary negative electrode material that has an excellent resistance to heat and allows a lithium secondary battery to have increased safety, reliability, and capacity.

The invention claimed is:

1. A lithium secondary battery, comprising:
a negative electrode; a positive electrode using a lithium compound as an active material; an electrolyte between the negative electrode and the positive electrode; and a separator dividing the negative electrode and positive electrode from each other,
and the lithium secondary battery does not use a negative electrode wherein a negative electrode active material layer is applied on a surface of a negative electrode collector,
the negative electrode material comprising one of iron foil and iron-base alloy foil, wherein the one of the iron foil and the iron-base alloy foil has a thickness of 5 μm to 20 μm, and has a surface profile having a plurality of concave shaped hollows formed by heat treating with laser beam irradiation, melting and transforming the surface, and a depth from a plane surface of the concave shaped hollow at an edge of the hollow to a lowermost part of the hollow is 0.5 μm to 2.5 μm, the surface is a surface of the negative electrode which contacts with the electrolyte solution.

2. The lithium secondary battery according to claim 1, wherein the hollow is one of a hole and a recess.

3. The lithium secondary battery according to claim 1, wherein the one of the iron foil and the iron-base alloy foil serves as a negative electrode collector.

4. A method for manufacturing the lithium secondary battery according to claim 1, wherein providing a surface profile having a plurality of concave shaped hollows on the surface of the one of the iron foil and the iron-base alloy foil by heat treating the surface of the foil by irradiating and scanning the surface with a laser beam.

* * * * *